(12) United States Patent
Chavez et al.

(10) Patent No.: US 12,107,851 B1
(45) Date of Patent: Oct. 1, 2024

(54) DETECTING FAKE USER RECOGNITION AUTHENTICATION REQUESTS

(71) Applicant: United Services Automobile Association (USAA), San Antonio, TX (US)

(72) Inventors: Carlos J P Chavez, San Antonio, TX (US); Sacha Melquiades De'Angeli, San Antonio, TX (US); Oscar Guerra, San Antonio, TX (US); David M. Jones, Jr., San Antonio, TX (US); Gregory Brian Meyer, San Antonio, TX (US); Christopher Russell, San Antonio, TX (US); Arthur Quentin Smith, Fredericksburg, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 0 days.

(21) Appl. No.: 18/182,915

(22) Filed: Mar. 13, 2023

Related U.S. Application Data

(63) Continuation of application No. 16/836,769, filed on Mar. 31, 2020, now Pat. No. 11,611,550.

(51) Int. Cl.
*H04L 9/40* (2022.01)
(52) U.S. Cl.
CPC ........ *H04L 63/0853* (2013.01); *H04L 63/102* (2013.01); *H04L 63/105* (2013.01); *H04L 63/107* (2013.01); *H04L 63/1433* (2013.01); *H04L 63/20* (2013.01)

(58) Field of Classification Search
CPC . H04L 63/0853; H04L 63/102; H04L 63/105; H04L 63/20
USPC .............................................................. 726/5
See application file for complete search history.

(56) References Cited

U.S. PATENT DOCUMENTS

| | | | |
|---|---|---|---|
| 2014/0068790 A1* | 3/2014 | Chakraborty | G06F 21/34 726/30 |
| 2017/0311416 A1* | 10/2017 | Fu | H05B 47/19 |
| 2018/0012469 A1* | 1/2018 | Tofighbakhsh | G08B 21/02 |

* cited by examiner

*Primary Examiner* — Anthony D Brown
(74) *Attorney, Agent, or Firm* — Fletcher Yoder P.C.

(57) ABSTRACT

An authentication system for granting access to an account associated with a user. An authenticator of the authentication system including a processor and a memory, the authenticator configured to: receive a request for authentication that identifies the user; access an authentication account associated with the user, wherein the authentication account indicates a smart device associated with the user; activate a control parameter of the smart device, wherein the control parameter may cause an effect in a media sample from the smart device; receive the media sample from the smart device and determine if the effect corresponding to the control parameter is observed in the media sample; and in response to a determination that the effect is not observed in the media sample, indicate that the request for authentication is a fraudulent request.

20 Claims, 7 Drawing Sheets

DETECTING FAKE USER RECOGNITION AUTHENTICATION REQUESTS

CROSS-REFERENCE TO RELATED APPLICATION

This application claims priority to and the benefit of U.S. Non-Provisional application Ser. No. 16/836,769, entitled "DETECTING FAKE USER RECOGNITION AUTHENTICATION REQUESTS," filed Mar. 31, 2020, which is hereby incorporated by reference in its entirety for all purposes.

BACKGROUND

The present disclosure relates generally to systems and methods for electronic authentication of users. More specifically, the present disclosure relates to techniques for increasing an accuracy of detecting inauthentic user requests for an access into protected, secretive, sensitive, and/or personal data associated with an authentic user.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Modern organizations typically offer access to services and sensitive data via online portals (e.g., the Internet), which may be accessed from numerous locales across the globe. Because the data and/or services provided by these entities may be valuable, nefarious individuals may attempt to impersonate a user from one of the access sites, in an effort to gain unauthorized access to the data and/or to initiate unauthorized service transactions. To curb these efforts, businesses and other organizations (churches, government, clubs, etc.) typically implement authentication processes. Further, individuals that store sensitive and/or personal information on an electronic device may implement authentication processes to access their electronic devices or accounts or applications associated with their electronic devices. Authentication processes may include asking for username/password combinations. Moreover, some authentication methods include identifying facial features and/or a voice of an authentic user to increase a level of security. Unfortunately, hackers (e.g., unauthorized users) have eluded authentication methods that include facial recognition and/or audio recognition processes. Accordingly, improved techniques for authentication are desirable.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In an embodiment, an authentication system for granting access to an account associated with a user is provided. The authentication system includes an authenticator having a processor and a memory, which includes a non-transitory, tangible, and computer readable medium. The authenticator receives a request for authentication that identifies a user. The authenticator also accesses an authentication account associated with the user. The authentication account may indicate a smart device associated with the user. The authenticator activates a control parameter of the smart device. The control parameter may cause an effect in a media sample from the smart device. The authenticator receives the media sample from the smart device and determines if the effect corresponding to the control parameter is observed in the media sample. In response to a determination that the effect is not observed in the media sample, the authenticator may indicate that the request for authentication is a fraudulent request.

In an embodiment, an authentication system for granting access to an account associated with the user is provided. The authentication system includes an authenticator having a processor and a memory that includes a non-transitory, tangible, and computer readable medium. The authenticator may receive, from a computing device, a request for authentication that identifies a characteristic of a user. The authenticator accesses an authentication account associated with the user and having an audio pattern associated with the user based on the characteristic. The authenticator also prompts the user to provide an audio sample and initiate an audio emission via the computing device. The authenticator receives the audio sample from the computing device and determines if the audio sample contains the audio pattern and the audio emission.

In an embodiment, a non-transitory, tangible, and computer readable medium having instructions that, when executed by a processor, causes the processor to perform actions that include receiving a first audio/video (A/V) sample from a first computing device. The first (A/V) sample is indicative of a request for authentication to an account associated with a user. The processor also determines a location of the first computing device based on a global positioning system (GPS) coupled to the first computing device. The processor discovers a second computing device in a threshold proximity to the location and receives a second A/V sample from the second computing device. The processor compares the first A/V sample to the second A/V sample, and may indicate the first A/V sample as a fraudulent A/V sample in response to a result of a comparison between the first A/V sample and the second A/V sample indicating a different context.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
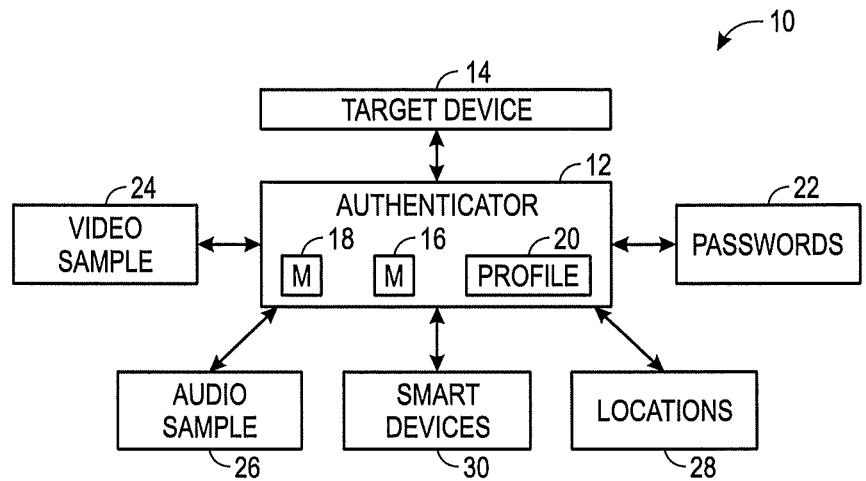
FIG. 1 is a schematic representation of an authentication system having an authenticator, in accordance with an embodiment of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As electronic devices become ubiquitous in society, the security of data is becoming a greater need. In particular, electronic devices such as mobile devices and the Internet of Things (IoT) may store and/or transfer personal and/or sensitive data associated with a person. In order to protect the personal and/or sensitive data from being intercepted by an undesirable entity (e.g., a hacker, government, competitor, political rival, former spouse, spy, etc.), it may be needed to authenticate an entity attempting to access such data.

Recently, we have also seen a rise in "deepfakes," which are media (video and/or audio) samples of a person that has been stitched together to give an appearance of the person saying a set of words or performing a set of actions. The set of words and/or the set of action performed in the "deepfake" may not have been truly said or performed by the person for the given context. For example, a "deepfake" that utilizes a voice of a person may be used to access data associated with the person, even though the person may have not said such words for such context. For example, a "deepfake" may be created to request access to a device or website that requires video and/or audio feed of a user. Without methods to determine if a video and/or audio sample is a "deepfake," a hacker (e.g., an unauthorized person) may gain access into personal and sensitive data corresponding to an authorized person, compromising devices and accounts associated with the authorized person. Thus, detecting fraudulent video and/or audio feed is desirable.

For purposes of our present discussion, it may be helpful to define a few terms. A user may refer to a person authorized to access a device. A proxy may refer to a person that requests authentication into the device. Sometimes, the proxy and the user are the same entity. However, sometimes, the proxy and the user are different entities. It is therefore desirable to have techniques to recognize proxies that are not users. That is, techniques that detect illegitimate user requests for access into a device, an account, an application, or the like that is associated with a user are desirable.

Currently, techniques for user authentication may include receiving an alphanumeric password, receiving a proxy's fingerprint, receiving audio and/or video feed of a proxy. These techniques above may be compared to respective stored values for authentication. For example, an alphanumeric password may be compared to a predetermined alphanumeric password. In response to receiving the alphanumeric password, the authentication request may be verified. Another example may involve receiving video feed containing a face of a proxy and determining if the facial features detected in the video feed matches stored facial features associated with a user. Although facial recognition may be more secure than an alphanumeric password, illegitimate proxies (e.g., hackers) may employ systems that create a voice or an appearance of a user to access an account associated with the user. Without authentication mechanisms that are accurate in detecting fraudulent audio and/or video samples, an illegitimate proxy (e.g., a proxy that is not the user) may be granted access to the account associated with the user. Thus, systems that incorporate mechanisms useful in detecting fraudulent audio and/or video samples of a user are needed.

Present embodiments are generally directed toward improved systems and methods for detecting fraudulent user recognition. Such systems and methods may be used in authenticating a proxy desiring access into sensitive data (e.g., a bank account associated with a user). In addition, such systems and methods in operation may decrease an amount of unauthorized accesses into the sensitive data. In an embodiment, an authentication system includes an authenticator that receives audio and/or video (A/V) samples from a computing device, and activates another computing device in a location proximate to the computing device. The authenticator may access A/V capabilities of the other computing device, and then receive A/V samples from the other computing device. The authenticator may compare A/V samples from the computing device with the A/V sample from the other computing device, and then detect if the first A/V sample is fraudulent based on the comparison. In another embodiment, an authentication system includes an authenticator that receives A/V samples from a computing device, and then analyzes background noise or scenes (e.g., context) in the audio/video samples to determine if one or more indications of stitching of different video clips exists. In another embodiment, the authentication system includes an authenticator that activates light control parameters associated with a smart device in a vicinity of the computing device and observes reflections on or responses by the proxy based on the activated light control parameters. If the authenticator observes reflections or other changes that correspond to the activated light control parameters, then the authenticator may grant access to the proxy. However, if the authenticator does not observe reflections or other changes that correspond to the activated light control parameters, then the authenticator may indicate that the video sample is a stitching.

Turning to the drawings, FIG. 1 is a schematic representation of an authentication system 10. The authentication system 10 includes an authenticator 12, which serves as an authenticating mechanism to access a target device 14 (e.g., mobile device, bank account, sensitive data associated with a user or business). In the illustrated embodiment, the authenticator 12 is communicatively coupled to the target device 14 and can be part of the target device 14. In some embodiments, the authenticator 12 may be located on the same device or server as the target device 14. In other embodiments, the authenticator 12 is located on a different device or server than the target device 14. The target device 14 may refer to an account, a particular software, sensitive data associated with a user or business, a smart device (e.g., appliance, light bulb, outlet, a device that has a radio communication circuitry, etc.), a computing device (e.g., a mobile device, a personal computer), a human (e.g., via a texting or verbal communication application), etc. It is to be understood that the target device 14 does not necessarily have to refer to an actual device, but rather, it can also refer to software and/or data being stored in a computer-readable memory on the target device 14, for example.

An enterprise or individual who desires to protect access to the target device 14 may employ the authenticator 12. The authenticator 12 includes a memory 16 and a processor 18, which may execute the instructions stored in the memory 16. In particular, the memory 16 may be a non-transitory, tangible, and computer-readable medium that stores instructions that the processor 18 may execute.

The authenticator 12 also includes profiles 20 (e.g., user account profiles, authentication accounts). The profiles 20 may include information relevant to a user that may be used to authenticate a request into the target device 14. In particular, the profiles 20 may include facial features, voice features, biometrics, passwords (e.g., alphanumeric and sound passwords), common locations, smart devices (e.g., IoT associated with the user), common mannerisms, common behaviors (e.g., timing, language, accent, etc.) and the like that are associated with the user. Indeed, the profiles 20 may contain data of facial characteristics of a user and speech patterns/characteristics of a user. Smart devices that are associated with the user may include a smart car, a smart refrigerator, a doorbell system with audio/video capabilities, a computer, and a mobile device, for example. The profiles 20 may also include audio/video samples that have previously been used to authenticate a user request for access into the target device 14. In some embodiments, data in the profiles 20 may have been created or determined in an initialization or enrollment period of the target device 14. For example, upon a user registering a mobile device for a particular service, the entity providing the particular service may have requested that the user provide a video sample 24, an audio sample 26 (e.g., a pet's bark), a signature (e.g., using pen or finger on a screen), addresses, control capabilities of smart devices associated with the user, and the like. The profiles 20 may be accessed upon the authenticator 12 receiving a request for authentication into the target device 14.

When a proxy requests access to the target device 14, the authenticator 12 may activate, and then determine a user account profile associated with the user. The authenticator 12 may request a video sample 24 and/or audio sample 26 of the user (e.g., live audio/video feed) to be transmitted. The authenticator 12 may also request that the proxy (or the computing device from which the proxy's request is sent) transmit a location 28 to the authenticator 12. In this way, the authenticator 12 may attach the location 28 to the alleged user request. Further, the authenticator 12 may timestamp the transaction of the authentication request. Upon receiving the A/V sample(s), the authenticator 12 may determine if the A/V samples contain indications of stitching. For example, the authenticator 12 may analyze background noise in the audio sample 26, and determine if a context given by the location 28 of the computing device transmitting the request matches a context analyzed in the background noise. If the background noise, when analyzed, demonstrates characteristics having abrupt changes in contexts, then the authenticator 12 may determine that the audio sample 26 is fraudulent. The authenticator 12 may also determine a context in which words are allegedly said by the alleged user to determine if the audio sample 26 is fraudulent. If the words said in the audio sample 26 are indicative of different contexts (e.g., yelling and whispering), then the authenticator 12 may determine that the audio sample 26 is a stitching and not originating from an authentic user.

The authenticator 12 may also analyze the video sample 24 and determine if the video sample 24, which may have a corresponding audio sample 26, is a stitching. For example, the authenticator 12 may determine if background scenes of the video sample 24 matches a context given by a location 28 of the computing device from which the video sample 24 is allegedly being sent. For example, if the video sample 24 indicates that the proxy (e.g., alleged user) is in sunny weather, while the location 28 of the computing device transmitting the video sample 24 indicates a location in which the sun has already set, then, the authenticator 12 may indicate the video sample 24 as fraudulent. As another example, if the proxy is in an outside environment, the authenticator 12 may receive a video sample 24, a location, and a direction of orientation relative to cardinal directions (e.g., North, East, South, West) from a phone (e.g., a computing device). After receiving such direction and location, the authenticator 12 may determine an expected angle of shadows based on the location of the phone and a predicted position of the sun for the specific time of day and latitudinal and longitudinal position indicated by the location. The authenticator may then calculate an angle of shadows indicated by the video sample. Specifically, the authenticator 12 may determine if the angle of shadows calculated properly aligns (e.g., corresponds) with the expected position of the sun for the specific time of day and latitude and longitude. Further, as another example, the authenticator 12 may analyze changes in light patterns or light reflections from a facial area or another part of the proxy and determine if the authentication request is authentic. If the light reflections from the pertinent part of the proxy indicate different contexts at different points in time throughout the video sample 24, then the authenticator 12 may indicate the video sample 24 as fraudulent. The authenticator 12 may analyze the A/V samples based on the location 28 of the computing device and contexts indicated by the A/V samples.

Further, the authenticator 12 may also detect a speed and/or a direction of orientation of the computing device, which may be on a commuter train, ferry, bus, subway, or aircraft. These measurements may be used in conjunction with the location 28 to determine a likelihood of the authentication request being fraudulent.

The authenticator 12 may be communicatively coupled to smart devices 30 associated with the user and/or a user's account. For example, as mentioned earlier, the profile 20 may contain data such as access keys to access smart devices 30 (e.g., a smart car, a smart house, a smart light, a laptop, etc.) that the user wished to associate with his/her account. The authenticator 12 may access a smart device and modulate or control the smart device in order to detect if a user request is fraudulent. For example, the authenticator 12 may ask a requestor (e.g., a proxy) to verify a certain modulation of a smart light located in a home or office of a user. If the authenticator 12 receives an indication (e.g., a reply) from the alleged user of a modulation different from the certain modulation, then the authenticator 12 may determine the request as a fraudulent request. The authenticator 12 may access smart devices 30 based on a shared location of the computing device from which the authentication request is being made and the smart device. For instance, if the location 28 indicated by the computing device is not at a home of the user, then the authenticator 12 may not send controls to smart devices 30 that are located in the home of the user. By accessing smart devices 30 associated with a user based on a location of the user as indicated by the location 28 from which the authentication request transmits, the authenticator 12 employs authentication methods that may be difficult for hackers to compromise. It should be noted that the authenticator 12 may also be communicatively coupled to other devices and, as such, the smart devices that are listed herein are purely to be representative and/or illustrative of the capabilities that the authenticator 12 has.

Figure 2:
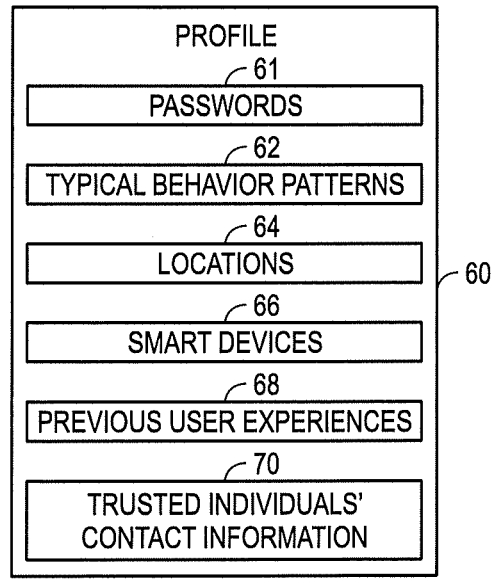
FIG. 2 is a schematic representation of a user account profile associated with a user and accessed by the authenticator of FIG. 1, in accordance with an embodiment of the present disclosure.

FIG. 2 is a schematic illustration of a profile 60 (e.g., user account profile) that contains information associated with a user of the target device 14 of FIG. 1. In some embodiments, the profile 60 may be located on the target device 14 or in the authenticator 12 of FIG. 1. Regardless of the location, the authentication system 10 of FIG. 1 may access the profile 60 upon receiving an authentication request from a computing device. The profile 60 includes passwords 61, typical behavioral patterns 62, (common) locations 64 of the user, smart devices 66 associated with the user, previous user experiences 68 (e.g., financial transactions history in the past month), and contact information 70 of trusted individuals associated with the user. In accordance with present embodiments, each of these may be used individually or in combination to facilitate confirming a user request is authentic.

The profile 60 includes typical behavior patterns 62 associated with the user. For example, the profile may include common days of the week and/or times of days that the authentic user accesses his or her account. The typical behavior patterns 62 may also include talking patterns that the user may say before performing a transaction. For example, the user may commonly talk about specific subjects or use certain words prior to performing a transaction. The profile may include audio samples and/or video samples that may have been analyzed to determine such subjects and/or words used by the user prior to performing the transaction.

The profile 60 also includes locations 64. The locations 64 may include common geographical locations by which the user typically requests access. Also, the locations 64 may include recollections of attributes (e.g., commonly used access points, types and/or names) of Wi-Fi networks that are commonly accessed by the user.

The profile 60 further includes smart devices 66 associated with the user. The smart devices 66 may include both hardware and software components. For example, the smart devices 66 may include smart lights, personal assistant devices, and/or IoT devices associated directly or indirectly to the user (e.g., a smart device associated with a friend of the user). An authenticator may access control settings associated with the smart device 66. For example, if the proxy requests authentication from a home associated with the user, then the authenticator may access control settings of a smart light located in the home. For instance, the authenticator may transmit specific light control parameters to the smart light to cause the smart light to be driven in accordance with a specific light pattern (e.g., a certain change of colors, a certain number of times of light activation and deactivation in a specific time period), and then ask the proxy to confirm details of the specific light pattern. The proxy may confirm the specific light pattern by any suitable method including texting, pressing a button on a keypad, speaking, etc. In this way, the authenticator may increase access security by confirming that the location of the proxy, which may be based on a location transmitted by the device through which the proxy is making the authentication request, is near the location of the smart device 66, which the user may have previously authorized the authenticator to access and use for authentication procedures.

As another example, the authenticator may receive a confirmation of a light pattern transmitted without input from the proxy. For instance, the authenticator may control a smart light and receive video feed from a computing device to confirm the light pattern rather than requesting the proxy to confirm the light pattern. This embodiment may be particularly useful in determining whether a request is from a particular user. If the light pattern indicated by the video sample is indicative of the transmitted light pattern, then the authenticator may allow access to the proxy. However, if the light pattern indicated by the video feed is different than the transmitted light pattern, the authenticator may deny access to the proxy.

The profile 60 also includes a recollection of previous user experiences 68. For example, the previous user experiences 68 may include a list of transactions that the user made in a previous month. The previous user experiences 68 may also include known locations of the user in the past month. These experiences may be used by the authenticator to authenticate a proxy. For example, the authenticator may ask the proxy to select a restaurant that the user did not go to the last month. As another example, the authenticator may provide four transactions that the user performed in the past week and may request that the proxy place the four transactions in an order based on when the user performed the transaction (e.g., most recent to least recent). The authenticator may receive the input from the proxy via any suitable method (e.g., a voice, text, input received via a graphical user interface associated with a computing device belonging to the user).

The profile 60 also includes contact information 70 associated with one or more individuals trusted by the user. The contact information should not be understood as merely a home address, email, or phone number of a trusted individual. Rather, the contact information also includes smart devices that are associated with the trusted individuals. Indeed, the authenticator may request a usage of audio and/or video capabilities specific to a smart device (e.g., a mobile device) associated with the trusted individual to confirm a user request for authentication. In other words, the smart devices associated with the trusted individuals may be used to, for example, confirm and/or verify that an authentic user is requesting authentication. As will be discussed in detail with respect to FIG. 3, in some embodiments, the trusted individual may simply be a member associated with an enterprise utilizing the authenticator for security. That is, the trusted individual may or may not have a relationship with the user other than being a part of a similar organization or a customer of an identical enterprise.

It should be noted that in some embodiments of the profile 60, one or more components may or may not be included. Further, it should also be noted that one or more components of the authentication system 10 of FIG. 1 may or may not be included in some embodiments of the authentication system 10 of FIG. 1.

Figure 3:
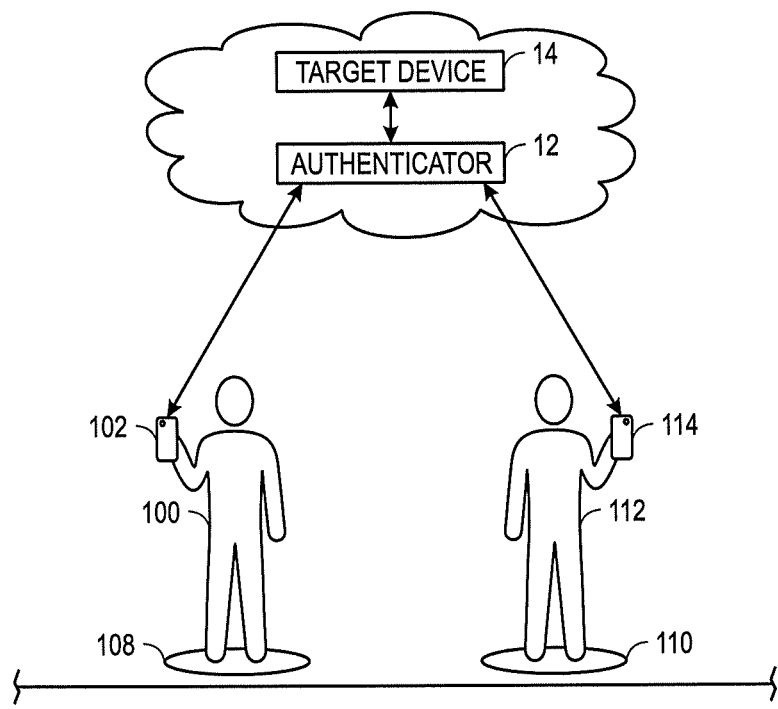
FIG. 3 is a schematic representation of an example use case of the authenticator of FIG. 1 utilizing a smart device associated with a trusted individual to determine if a user has transmitted an authentication request, in accordance with an embodiment of the present disclosure.

FIG. 3 is a representation of an example use case of an authenticator (e.g., the authenticator 12) utilizing a smart device associated with a trusted individual of a user to determine if a proxy is the user associated with an account, in accordance with an embodiment. Specifically, a proxy 100 holding a mobile device 102 requests access to the target device 14 (e.g., a bank account). The proxy 100 may request access by providing live audio (e.g., a phone call) and/or video feed to the authenticator 12. In some embodiments, the authenticator 12 may activate itself in response to the request by the proxy 100. The authenticator 12 may determine a location 108 of the proxy 100, via a global positioning system (GPS) module in the mobile device 102, for example. Using the determined location 108 of the proxy 100, the authenticator 12 may determine if one or more persons associated with the user are at or near the location 108, which is where the request was transmitted. The authenticator 12 may determine such persons by accessing data of contact information 70 of trusted individuals of FIG. 2 associated with the profile 60, for example, and iteratively searching for locations indicated by smart devices (e.g., mobile devices) linked to the trusted individuals that are near the location 108. In response to finding a location 110 of a person 112 (e.g., trusted individual) that is near the location 108, the authenticator 12 sends a notification to a mobile device 114 of the person 112. Identifying locations of persons (e.g., the person 112) may include identifying a location of a portable device (e.g., the mobile device 114) associated with the person 112.

In FIG. 3, the authenticator 12 locates the person 112 associated with the user as being in a location at, near, and/or in a threshold proximity to the location 108. The authenticator 12 sends a notification (e.g., a call) to a mobile device 114 associated with the person 112. The notification may include a request to confirm an identity of the proxy 100 (i.e. to confirm if the proxy 100 is indeed the user). In some embodiments, both the person 112 and the user may routinely use the same provider application via one or more computing devices. Moreover, the mobile devices 102 and 114 may be video enabled. The authenticator 12 may be able to utilize the video capabilities of the mobile devices 102, 114. Indeed, the authenticator 12 may receive a video sample in the authentication request from the mobile device 102. Even though the video sample may appear to be the user, the authenticator still may request the location 108 to be transmitted from the mobile device 114. Based on the location 108, the authenticator 12 may locate the person 112 as being at, near, and/or in a threshold proximity to the location 108. The authenticator may then access video features of the mobile device 114 to which to compare a context of the video sample sent from the mobile device 102. In some embodiments, the authenticator 12 accesses and/or activates audio features of the mobile device 114 to which to compare an audio sample received from the mobile device 102. In particular, in an embodiment, the authenticator 12 compares background scenes/noise from the mobile devices 102, 114 to determine whether any background scenes/noise indicate a discrepancy in location, thus indicating a fraudulent request.

Figure 4:
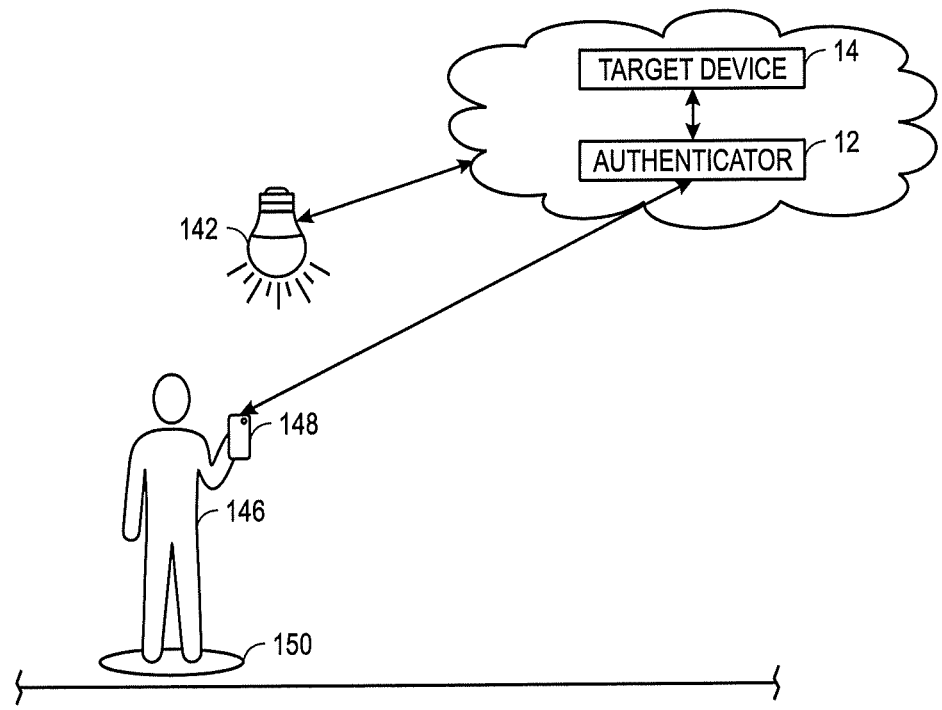
FIG. 4 is an example use case of the authenticator of FIG. 1 controlling a smart light to determine if a user has transmitted an authentication request, in accordance with an embodiment of the present disclosure.

FIG. 4 is an example use case of the authenticator 12 controlling a smart light 142 to determine if a request to access the target device 14 originates from a user, in accordance with an embodiment. In particular, a proxy 146 holding a mobile device 148 transmits a request to the authenticator 12 to access the target device 14. The authenticator 12 also receives a location 150 (and/or timestamp) from which the request is sent. Upon receiving the request, the authenticator 12 may retrieve a profile associated with the user (e.g., the profile 60 of FIG. 2). Based on the profile, the authenticator 12 may determine one or more smart devices associated with the user at, near, or in a threshold proximity to the location of the proxy 146. As mentioned earlier with respect to FIG. 2, a profile containing access keys/passwords to smart devices may have been created upon registering directly with an entity that manages the authenticator 12 or with an enterprise that utilizes the authenticator 12. The authenticator 12 finds the smart light 142 in a location near the location 150. The smart light 142 may be connected to the Internet such that the authenticator 12 can access control settings of the smart light 142 to confirm that the proxy 146 is actually in the location 150 in real time.

For example, upon receiving an authentication request (e.g., an audio and/or video sample), the authenticator 12 accesses the smart light 142. The authenticator 12 may store specific light patterns and/or specific light activation and deactivation signals (e.g., instructions) that are to be used in authenticating the proxy 146. For example, the authenticator 12 may cause the smart light 142 to blink a certain amount of times in a certain timeframe. The authenticator 12 may ask the proxy 146 to confirm a number of times the smart light 142 was deactivated (e.g., blinked) in the certain timeframe. As another example, the authenticator 12 may require video feed sent by the mobile device 148 to include the smart light 142 in the video when the authenticator 12 sends a certain light pattern to be performed by the smart light 142. In this way, the authenticator 12 may receive a pattern via video feed that matches the pattern it sends. Indeed, in this case, the authenticator 12 does not need the proxy 146 to verify the light pattern given by the smart light 142, since it can receive video feed of the light pattern. In fact, the light pattern may be at a frequency that is not detectable by the human eye.

In some embodiments, the authenticator 12 may observe a reflection of light emitted from the smart light 142 on the proxy 146. In these embodiments, the authenticator 12 may determine if reflection patterns indicated by the proxy 146 in the video feed are indicative of the light patterns transmitted. Further, the authenticator 12 may send control parameters comprising a specific light pattern or sequence of lights to the mobile device 148, which the proxy 146 is holding. Indeed, the authenticator 12 may change a light frequency or intensity (i.e. brightness) of the light emitted from the mobile device 148. Based on such a stimulus, the authenticator 12 may compare actual reflections observed on the facial features of the proxy 146 to expected reflections. For instance, the authenticator 12 may present a sequence of lights at a rate that causes a human to see only one, two, or a few colors. The authenticator 12 may compare the reflections (e.g., images) received by the mobile device 148 and determine if reflections at specific times in which specific colors of light were shone match the expected reflections.

In some embodiments, the authenticator 12 may cause a sequence of light of different frequencies to be displayed at a rate so fast that a user observes white light. However, the camera on the mobile device 148 may have a frame rate that is faster than or equal to the rate at which the light frequencies change. The authenticator 12 may receive frames that the camera captures, and may compare the reflections observed in each frame, to expected reflections for each frame. The authenticator 12 may observe a reflection on a face or in another part of the proxy 146. Based on the light frequencies reflected from the proxy 146, the authenticator 12 may determine if the video feed is a live video. It should also be noted that different colored shapes maybe shown via a display of mobile device 148, and based on the shapes indicated by the reflections observed on the proxy 146, the authenticator 12 may determine if a video sample is a clip or live interaction.

As another example, the authenticator 12 may determine an inauthentic video sample (e.g., a fake video clip) by detecting light reflections in the pupils of the proxy 146. The authenticator 12 may cause different colored shapes to be displayed on the mobile device 148, and then may analyze a reflection in the pupil of the proxy 146 to determine if the reflected image corresponds to different colored shapes. Indeed, the authenticator 12 may observe a pattern on a pupil of the proxy 146 and use such an observation in determining a fake. Indeed, an improper or untimely reflection observed on facial features, for example, may indicate that a video sample is a stitching.

In some embodiments, the authenticator 12 may cause the mobile device 148 to vibrate to detect if the eyes or expression of the proxy 146 changes in concurrence with the vibration. For example, the authenticator may send a vibration pattern to the mobile device 148 while the mobile device 148 is transmitting a video sample. The video sample may be analyzed to determine if the vibration pattern indicated by the video matches, to a certain threshold percentage, the vibration pattern sent by the authenticator 12. Specifically, in an embodiment, the authenticator 12 may analyze if the eyes and/or expression of proxy 146 indicated by the video sample matches an expected pattern to the threshold percentage. It should be noted that the threshold percentage may be determined by the user or by the entity managing or providing the authenticator 12. In addition, the authenticator 12 may send the vibration pattern and the light control parameters to the smart light 142 simultaneously in order to detect if both the vibration pattern and the light control parameters are indicative of a stitching.

Figure 5:
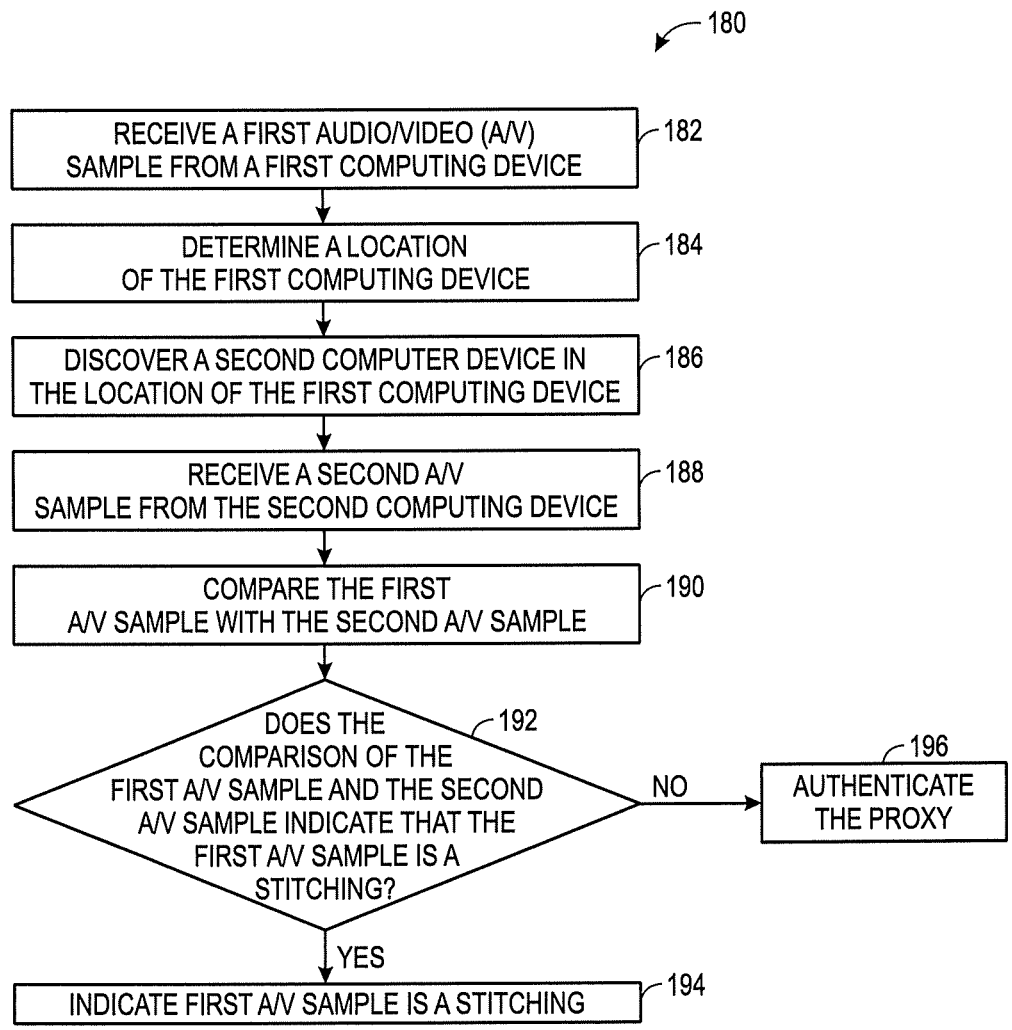
FIG. 5 is a flowchart illustrating a process for determining if a particular user is requesting authentication based on related media (audio and/or video data), in accordance with an embodiment of the present disclosure.

FIG. 5 is a flow chart illustrating a method 180 for detecting a fraudulent user authentication request, in accordance with an embodiment. In particular, the method 180 may be used to detect an audio or video stitching. It should be noted that the method 180 may be performed by one or more components of the authentication system 10 of FIG. 1. The method 180 begins with receiving (block 182) a first audio/video (A/V) sample indicative of an authentication request from a first computing device. The first audio/video sample may be an allegedly live audio/video sample (e.g., A/V sample received in real-time or near real-time). The first A/V sample may come from a computing device (e.g., a mobile device) that has audio and/or video capabilities or from a computing device that solely stores audio and/or video data. Nevertheless, an authenticator, for example, may receive the authentication request.

The method 180 proceeds with determining (block 184) a location of the first computing device. For example, an authenticator may determine the location by a human operator asking the proxy to speak or text his/her location. As another example, the method 180 may determine the location by accessing a GPS capability associated with the first computing device.

Having determined the location of the computing device, the method 180 proceeds with discovering (block 186) a second computing device in the location of the first computing device. The second computing device has similar capabilities as the first computing device. That is, the second computing device has A/V capabilities. For example, if a proxy or first computing device indicates a location at the home of a user, then at block 186, the authenticator, for example, may discover the second computing device at the home of the user. As noted above, in some embodiments, the method 180, at block 186, may include accessing an account of the user to determine computing devices that the user has authorized for access for multi-factor authentication.

The method 180 continues with receiving (block 188) a second A/V sample from the second computing device. For example, the second A/V sample may confirm a location of the first computing device based on the context indicated by the second A/V sample. The method 180 then proceeds with comparing (block 190) the first A/V sample with the second A/V sample. For example, at block 190, the method 180 may include analyzing background scenes/noise detected in the second A/V sample and comparing them with the background scenes/noise detected in the first A/V sample to determine (decision block 192) if the comparison indicates that the first A/V sample is a stitching. If the background scenes/noise detected in the second A/V sample do not correspond to the background scenes/noise detected in the first A/V sample, the method 180 may proceed with indicating (block 194) that the first A/V sample is a stitching. Further, the second A/V sample may also be used to confirm a location of a proxy, for example. If the second A/V sample indicates a context different from the context indicated by the first A/V sample, the method 180 may also proceed with indicating (block 194) that the first A/V sample is a stitching. If the comparison does not indicate fraud, then the method 180 may proceed with authenticating (block 196) the proxy.

It should be noted that, in some embodiments, the method 180 may include other authentication steps disclosed herein before or after indicating the first A/V sample is a stitching or authenticating the proxy. Furthermore, it should also be noted that one or more steps of the method 180 may or may not be included in an embodiment of the method 180.

Figure 6:
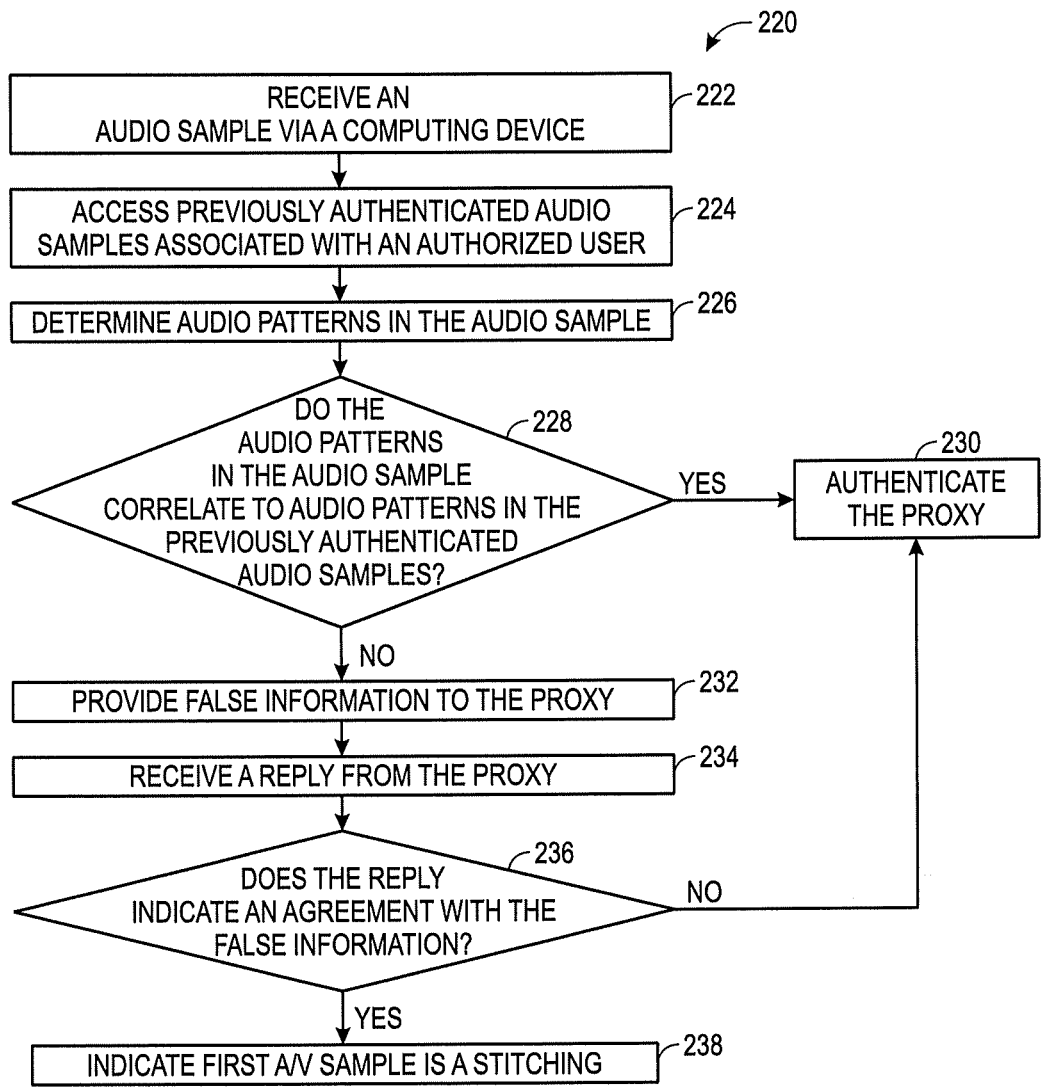
FIG. 6 is a flowchart illustrating a process for determining if a particular user is requesting authentication based on data patterns, in accordance with an embodiment of the present disclosure.

FIG. 6 is a flow chart of a method 220 for detecting a fraudulent user authentication request, in accordance with an embodiment. In some embodiments, the method 220 may be performed by one or more components of the authentication system 10 of FIG. 1 (e.g., the authenticator 12).

The method includes receiving (block 222), from a computing device (e.g., a mobile device), an audio sample indicative of authentication request. For example, a proxy may initiate a telephone call and request authentication to obtain bank account information or to perform a transaction. The method 220 continues with accessing (block 224) previously authenticated audio samples and/or patterns associated with an authorized user. The previously authenticated audio samples may also be used to train an artificial intelligence (AI) component to recognize a voice of a user. For example, in the beginning of the licensing of a software to a user, the user may have performed one or more authentication requests in order for the AI component to train by learning talking patterns associated with the user. Moreover, based on previously authenticated audio samples, the AI component may become more learned in even detecting context in which specific words are typically used by the user, such as typical subjects that the user refers to prior to performing a transaction. In addition, in some embodiments, a location of a user is attached to the audio sample. A location of the audio sample can also be assessed (e.g., confirmed) by the patterns in the audio sample by analyzing background noise in the audio sample.

The method 220 continues with determining (block 226) one or more patterns in the audio sample presently received. For example, block 226 may include determining patterns in the background noise of the audio sample (e.g., detecting fluctuations in the background noise). In addition, block 226 may include determining patterns associated with the voice of the proxy in the audio sample. For example, a voice of proxy may indicate a certain level of tiredness of the proxy. As another example, at block 226, a noise level associated with the proxy may be determined.

At block 228, the method 220 continues with determining (block 228) if the patterns determined in the audio sample are similar to or positively correlate to one or more of the audio patterns determined in the previously authenticated audio samples. For example, block 228 may include determining if a correlative value indicating a level of correlation (e.g., positive relatedness) between the patterns indicated by the previously authenticated audio samples and the patterns indicated by the present audio sample exceeds a threshold correlative value for authentication. If the level of positive correlation exceeds the threshold correlative value, the method 220 may proceed to block with granting (block 230) access to the proxy. The correlative value may directly increase with the number of patterns detected to be similar between the present audio sample and the previously authenticated audio sample. Based upon one or more of patterns the previously authenticated audio samples having one more characteristics similar to the one or more patterns presently received audio sample, the method 220 may determine if the request should be authenticated. For example, if the proxy uses certain words in the audio sample that match (e.g., have a similarity in tone or other speech characteristics) one or more sequences of words used by the user in previously authenticated requests, the method 220 may proceed with authenticating (block 230) the proxy.

If the level of correlation (e.g., level of relatedness) between the patterns determined in the audio sample and the patterns determined in the previously authenticated audio samples is not greater than a threshold level of correlation, then the method 220 may proceed with providing (block 232) false information to the proxy via the computing device in which the audio sample is being sent. For example, an authenticator may transmit a question asking the proxy how a vacation in a certain location in the previous month went, although the authenticator knows that the user did not go on to the certain location indicated by the question. The method 220 then proceeds with receiving (block 234) a reply from the proxy and then determining (block 236) if the proxy's reply is true. If the proxy's reply affirms the false information (e.g., indicates an agreement with the incorrect information), then the method 220 proceeds with indicating (block 238) that the request is a stitching (e.g., fraudulent). However, if the proxy denies the incorrect information, the method may proceed with other steps to authenticate the proxy as disclosed herein.

It should be noted that, in some embodiments, the method 220 may include other authentication steps disclosed herein. Furthermore, it should also be noted that one or more steps of the method 220 may or may not be included in an embodiment of the method 220.

Figure 7:
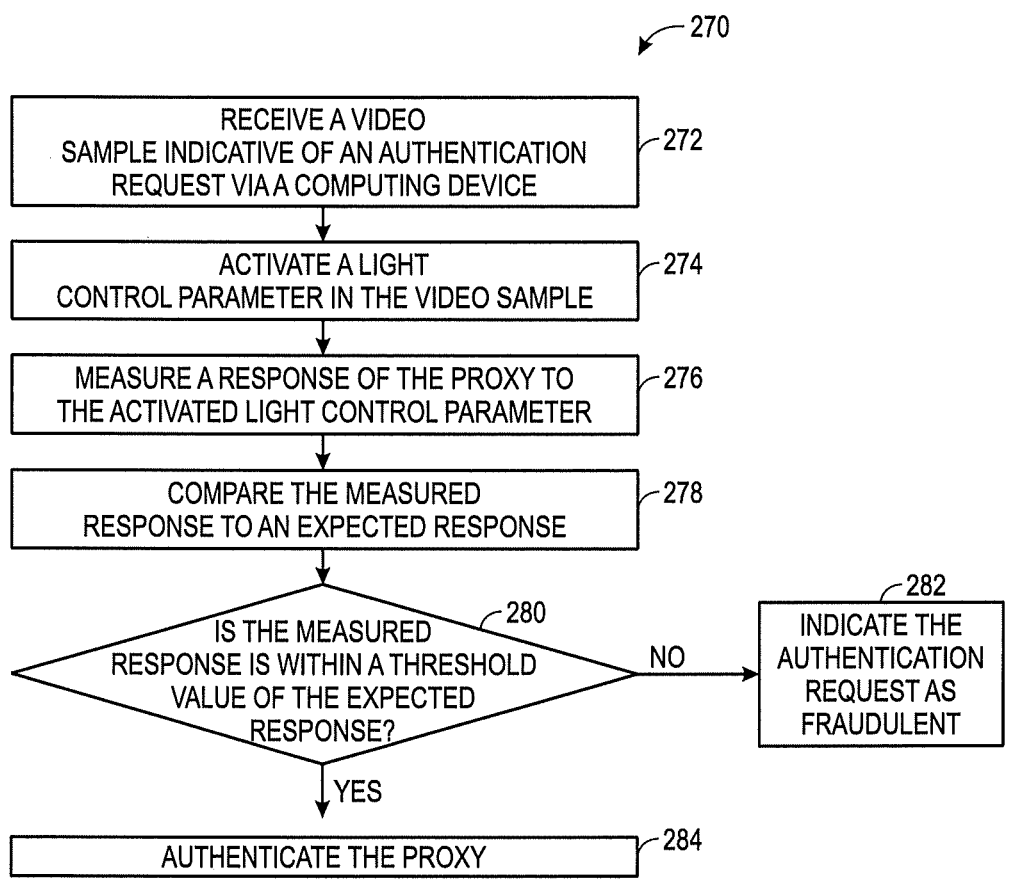
FIG. 7 is a flowchart illustrating a process for determining if a particular user is requesting authentication based on a response to lighting, in accordance with an embodiment of the present disclosure.

FIG. 7 is a flowchart of a method 270 for detecting a fraudulent user authentication request, in accordance with an embodiment. The method 270 may be performed by one or more components of the authentication system 10 of FIG. 1 (e.g. the authenticator). The method 270 begins with receiving (block 272) a video sample (e.g., live video feed) indicative of an authentication request via a computing device. The video sample may be an allegedly live feed video of a user associated with an account.

The method 270 continues with activating (block 274) a light control parameter in the alleged environment of the video sample. For example, a smart light may be in the environment of the video sample. The smart light may be controlled to emit light of specific frequencies. The effects of such controls may be detected by the video sample, which is transmitted via the computing device to an authenticator. As another example, the light control parameter may be a brightness level of a mobile device transmitting the video. Indeed, the method 270, at block 274, may include sending an activation signal for the mobile device to increase or decrease a current brightness of the mobile device.

The method 270 continues with measuring (block 276) a response of the proxy to the stimulus (i.e. change in light control parameter) as observed in the video sample. Block 276 may also include determining light reflections observed in the facial features of the proxy. For example, block 276 may include determining an amount of dilation that eye pupils of the proxy dilate in response to a certain light stimuli transmitted at block 274. As another example, block 276 may include receiving a reply from the proxy confirming a color or flicker in a light pattern displayed.

The method 270 continues with comparing (block 278) the measured response of the proxy observed in the video sample to an expected response. For example, it may be expected that the pupils of the proxy decrease in response to a brightness level of a mobile device increasing. If upon comparing the response of the proxy with the expected, no change in pupil diameter is observed, then the method 270 may proceed with suspecting the request as a fraudulent request. As another example, at block 274, a smart light providing light in the video sample may be controlled to change a frequency of emitted light. At block 278, a reflection corresponding to a time after the change of frequency of emitted light may be compared with a time corresponding to a time before the change of frequency.

The method 270 continues with determining (decision block 280) if the measured response is within a threshold value of the expected response. If the measured response is within a threshold value of the expected response, then the method 270 proceeds to authenticating (block 282) the proxy. However, if the measured response is outside a threshold value of the expected response, then the method 270 proceeds to indicating (block 284) the authentication request as a fraudulent authentication request. Indeed, in this case, it may be determined that the video is a stitching together of different videos of the true user rather than a live feed video of the proxy.

It should be noted that, in some embodiments, the method 270 may include other authentication steps disclosed herein. Furthermore, it should also be noted that one or more steps of the method 270 may or may not be included in an embodiment of the method 270.

Figure 8:
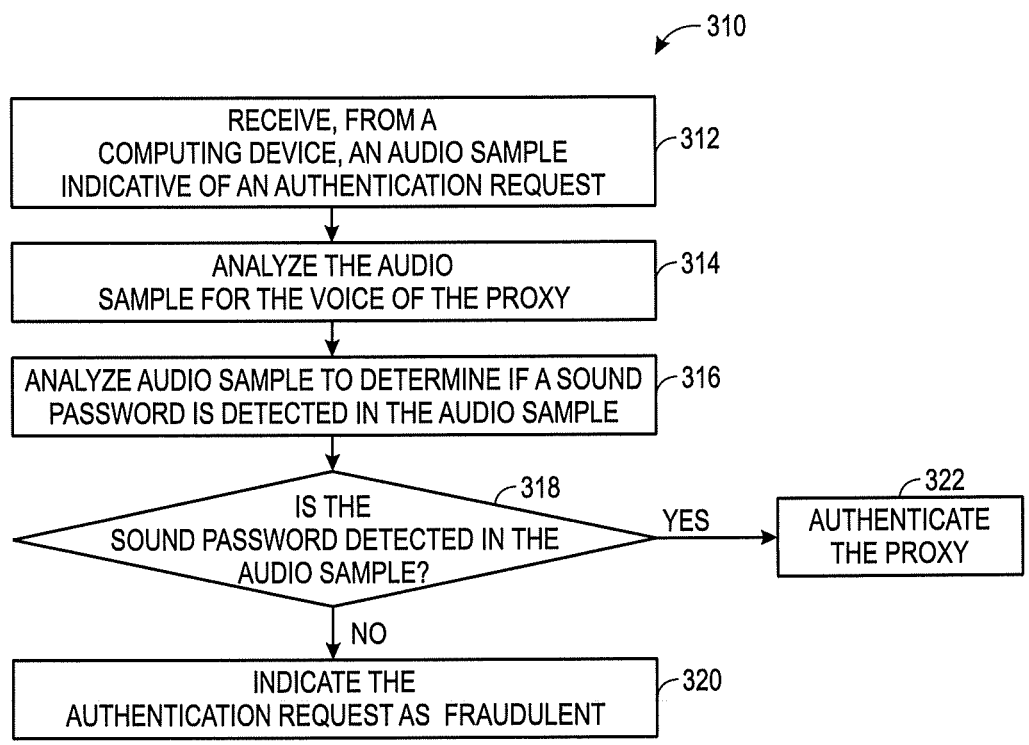
FIG. 8 is a flowchart illustrating a process for determining if a particular user is requesting authentication based on audio data, in accordance with an embodiment.

FIG. 8 is a flow chart of a method 310 for utilizing a specific, predetermined sound password to authenticate a proxy, in accordance with an embodiment. In some embodiments, the method 310 may be performed by one or more components of the authentication system 10 of FIG. 1 (e.g., the authenticator 12).

The method 310 begins with receiving (block 312), from a computing device (e.g., a mobile device), an audio sample indicative of authentication request. For example, a proxy may initiate a telephone call and request authentication for access to bank account details. The proxy may also transmit an audio sample to a personal assistant device.

In response to receiving the audio sample from the proxy, the method 310 proceeds with analyzing (block 314) the audio sample for voice recognition of the user. Specifically, the audio sample may be analyzed to determine if a voice received from the audio sample matches a voice stored in a memory of an authenticator used to authenticate the proxy. For example, before using in authentication device or in authentication application, it may have been required for a user, upon registration, to speak one or more words, so that voice recognition software associated with an authenticator may determine one or more sound characteristics or patterns associated with the user's voice.

The method 310 continues with analyzing (block 316) the audio sample to determine if a specific sound password (e.g., sound pattern) associated with the user is detected in the audio sample. Indeed, in some embodiments, block 316 includes accessing a profile associated with the user to determine which sound password the audio sample should be compared against. In some embodiments, the frequency of the specific sound password (e.g., audio emission) is outside a range of human hearing such that it would not affect recognizing the voice of the proxy. That is, the frequencies of speech of the proxy may be in a different range as the frequency of the specific sound password associated with the account. However, even though the sound pattern may be outside a range of human hearing, the device receiving the audio sample may detect the sound pattern. In addition, in some embodiments, the sound password may be present only when the proxy speaks; however, the sound password may not be a sound originating from the voice of the proxy. The sound password may be a special key that was determined during an initialization or registration period of an authenticator that utilizes the method 310. The user may have received or determined a specific sound to incorporate in authentication requests to provide more security into an account associated with the user.

The method 310 then proceeds with determining (decision block 318) if the audio sample contains the specific sound password. If the audio sample does not contain the specific sound password, then the method 310 may indicate (block 320) the request as a fraudulent authentication request. However, if the audio sample contains the specific sound pattern and a voice corresponding to the user, then the method 310 may authenticate (block 322) the proxy.

It should be noted that, in some embodiments, the method 310 may include other authentication steps disclosed in the present discussion. Furthermore, it should also be noted that one or more steps of the method 310 may or may not be included in an embodiment of the method 310.

Figure 9:
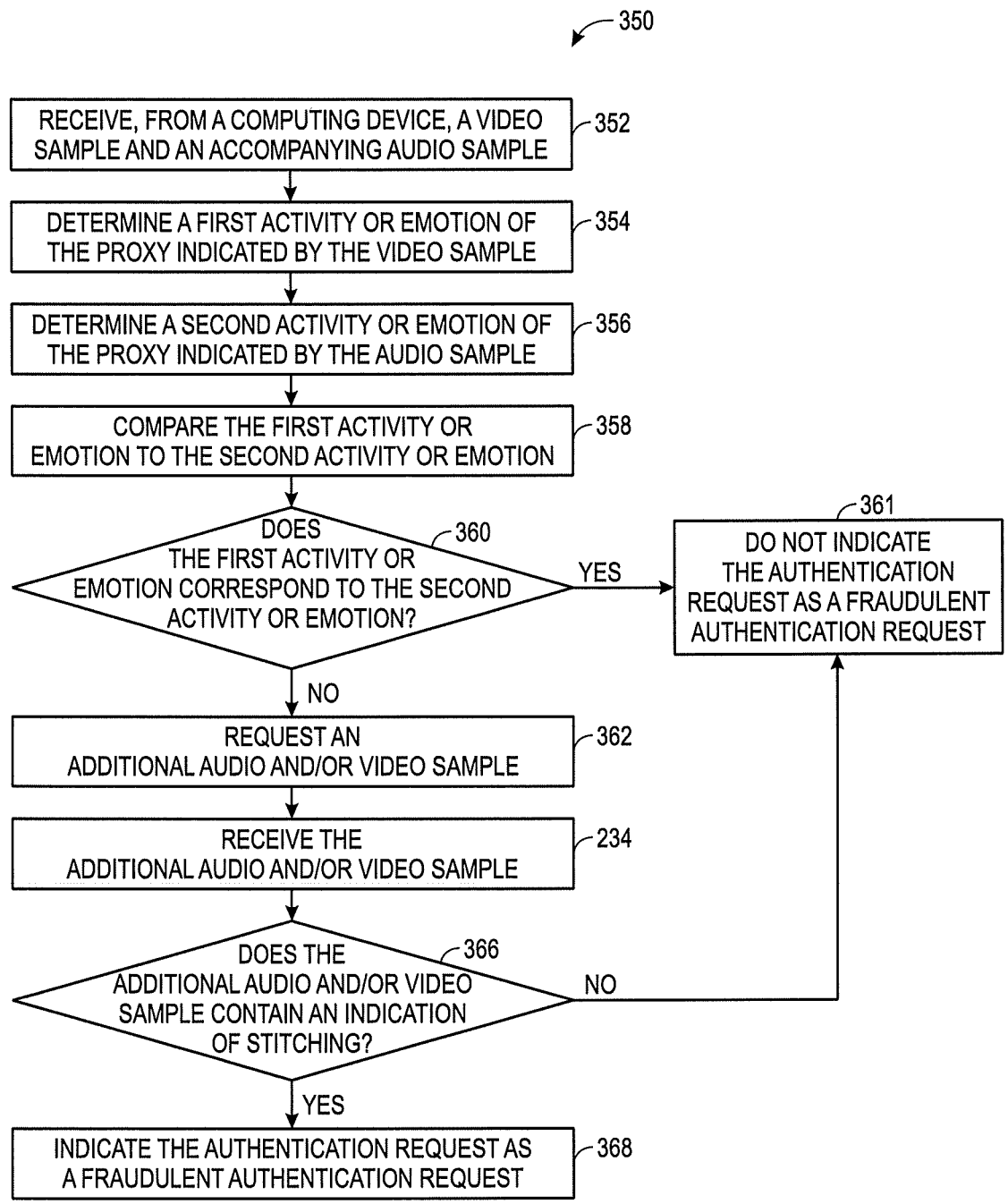
FIG. 9 is a flowchart illustrating a process for determining if a particular user is requesting authentication based on activity and/or emotional data, in accordance with an embodiment of the present disclosure.

FIG. 9 is a flow chart of a method 350 for determining if an authentication request is a fraudulent authentication request, in accordance with an embodiment. In particular, the method 350 includes determining a correlation (e.g., positive relatedness) between an activity and/or emotion (activity/emotion) indicated by an audio sample and another activity/emotion indicated by a video sample, and vice versa. The method 350 may be performed by one or more components of the authentication system 10 of FIG. 1 (e.g. the authenticator 12). The method begins with receiving (block 352) a video sample and an accompanying audio sample associated with the video sample. For example, at block 352, a live video feed containing audio is received. Based upon the video feed, the method 350 proceeds to determining (block 354) a first activity or emotion of the proxy indicated by the video sample. For example, the video sample may indicate that the proxy is bouncing. In this example, the method 350, at block 354, may determine that the proxy is jogging. As another example, the video feed may indicate that the proxy is in a car. Moreover, as another example, the video sample may indicate that the proxy is in a congested place such as in a coffee shop at a busy time. Based upon characteristics observed in the video sample, at block 354, a first activity or emotion of the proxy may be determined.

The method 350 continues with determining (block 356) a second activity or emotion of the proxy indicated by an audio sample. The activities or emotions indicated by the audio sample may be determined by analyzing a level of background noise. For instance, if the background noise is very loud, it may be determined that the user is in a place with many people. Moreover, a pace in which a user speaks may be detected and be determinative of a motion of the proxy. For example, if the proxy speaks relatively fast and the proxy's breathing in pants, then it may be determined that the proxy is walking, running, or is anxious. At block 356, a second activity or emotion of the user indicated by the audio sample may be determined.

The method 350 continues with comparing (block 358) the first activity or emotion of the proxy indicated by the video sample to the second activity or emotion indicated by the audio sample. For example, the method 350, at block 358, may include comparing background scenes to background noise as indicated by the video sample and the audio sample, respectively. The method 350 may then proceed with determining (decision block 360) if the first activity or emotion corresponds to the second activity or emotion. For example, the video sample may indicate motion in a park, or, in particular, an up-and-down motion in the park. If the audio sample contains background noise typical of pounding of feet against a ground, then the first activity indicated by the video sample, which may be jogging may correspond to the second activity indicated by the audio sample which may also be jogging provided the context given by the first video sample. In some embodiments, the method 350, at block 358, may compare the first activity/emotion in the second activity/emotion by utilizing one of them as a baseline context. For example, if the audio sample indicates an angry emotion of the user, then at block, the method may include searching for elements in the video sample that may correspond to anger (e.g., jerks in the video sample). If the first activity/emotion corresponds to the second activity/emotion, then the method 350 may proceed with not indicating (block 361) the authentication request as a fraudulent authentication request. However, if the first activity/emotion does not correspond to the second activity/emotion, then the method 350 may proceed to requesting (block 362) an additional audio and/or video sample from the proxy. This sample may be requested by asking the proxy to perform an action such as closing one eye, both eyes, left eye, right eye, or another simple sequence of actions in the video sample. The requested sample may also be a request for the proxy to repeat a simple phrase that is not attention getting or revealing such as a simple "yes," "maybe," or "thank you." The method 350 then proceeds with receiving (block 364) the requested sample from the proxy, and then determining (decision block 366) if the sample contains indications of stitching. If the sample received at block 364 indicates a different context (e.g., tone of voice, emotion, background scene) compared with the context determined at block 354 and/or block 356, then the method may proceed with indicating (block 368) the authentication request as fraudulent.

However, if the first activity/emotion corresponds to the second activity/emotion or if the additional sample corresponds to the context indicated by the first activity/emotion and/or second activity/emotion, then the method 350 may proceed to not indicating (block 370) the video sample and the audio sample as a fraudulent authentication request.

It should be noted that one or more steps of methods may be combined with one or more steps of other methods described and disclosed herein. Indeed, any of the methods described above may be combined to perform overlapping and/or supplemental functions in accordance with present embodiments.

Further, it should be noted that different authentication requests for access to specific accounts or performance of specific tasks (e.g., transactions) may require different amounts of confidence levels (e.g., confidence level of authenticity, confidence level of a stitching, or confidence level of correlation/discontinuity) to be met for access to be granted. Indeed, in some embodiments, a threshold percentage of certainty of authenticity of an authentication request for a first task may be lower or higher than a threshold level of certainty for a second task. For instance, a threshold percentage level of certainty or confidence required to move a significant amount of money from an account may be a 99% threshold percentage of certainty in the analytic results determined in one or more of the methods above. A threshold level of confidence for less impactful actions may be set as low as 85%, for example. It should be understood that any threshold level of confidence or certainty may be employed in accordance with present embodiments. In some embodiments, the user or proxy may set the threshold percentage levels. Thus, in one or more of embodiments disclosed above, authentication requests may be indicated as fraudulent or authenticated based on different threshold confidence levels.

While only certain features of the disclosure have been illustrated and described herein, many modifications and changes will occur to those skilled in the art. It is, therefore, to be understood that the appended claims are intended to cover all such modifications and changes as fall within the true spirit of the invention.

The invention claimed is:

1. An authentication system for granting access to an account associated with a user, the authentication system comprising:
   one or more processors; and
   a non-transitory, tangible, and computer-readable medium comprising instructions that, when executed by the one or more processors, cause the authentication system to perform operations comprising:
   receiving a request for authentication, the request indicating the user;
   in response to the request, instructing a smart device associated with the user to activate a light control parameter configured to cause a visual effect in a video sample;
   receiving the video sample;
   determining if the visual effect is observed in the video sample; and
   in response to determining that the visual effect is not observed in the video sample, indicating that the request for authentication is fraudulent.

2. The authentication system of claim 1, wherein activating the light control parameter comprises activating the light control parameter in accordance with a lighting pattern.

3. The authentication system of claim 2, wherein the lighting pattern comprises changes in color.

4. The authentication system of claim 1, wherein the smart device is a mobile device, and wherein the light control parameter is a parameter of a display of the mobile device.

5. The authentication system of claim 1, wherein the smart device is configured to record the video sample.

6. The authentication system of claim 1, wherein the video sample comprise audio and video data and wherein the operations comprise:
   instructing the smart device to activate an audio control parameter configured to cause an aural effect in the video sample; and
   in response to determining that the visual effect and the aural effect are not observed in the video sample, indicating that the request for authentication is fraudulent.

7. The authentication system of claim 6, wherein the aural effect is characterized by a frequency inaudible to a human ear.

8. The authentication system of claim 1, wherein the operations comprise:
   comparing the video sample to a pre-recorded video;
   determining a correlation value indicative of a level of relatedness between the video sample and the pre-recorded video; and
   in response to determining that the correlation value is below a threshold correlation value, indicating that the request for authentication is fraudulent.

9. The authentication system of claim 1, wherein determining if the visual effect corresponding to the light control parameter is observed in the video sample comprises detecting a light reflection on the user corresponding to one or more activations of the light control parameter.

10. An authentication system for granting access to an account associated with a user, the authentication system comprising:
    one or more processors; and
    a non-transitory, tangible, and computer-readable medium comprising instructions that, when executed by the one or more processors, cause the authentication system to perform operations comprising:
    receiving a request for authentication, the request indicating the user;
    receiving a video sample associated with the request;
    receiving a timestamp and a geographic location indicated as associated with creation of the video sample;
    determine an expected context of the video sample based on the timestamp and the geographic location;
    compare the expected context to a context of the video sample; and
    in response to determining that the context of the video sample does not match the expected context, indicate that the request for authentication is fraudulent.

11. The authentication system of claim 10, wherein the expected context comprises expected angle of shadows to be observed in the video sample based on a longitude and a latitude of the geographic location and the timestamp.

12. The authentication system of claim 10, wherein the expected context comprises a weather context to be observed in the video sample based on the geographic location and the timestamp.

13. The authentication system of claim 10, wherein the operations comprise determining a correlation value indicative of a level of relatedness between the expected context and the context of the video sample, wherein the context of the video sample does not match the expected context if the correlation value is less than a threshold correlation value.

14. The authentication system of claim 10, wherein the operations comprise receiving a direction of orientation indicated as associated with the video sample, wherein the expected context is based on the direction of orientation, the timestamp, and the geographic location.

15. The authentication system of claim 10, wherein the operations comprise:
   instructing a smart device associated with the user to activate a light control parameter configured to cause a visual effect in the video sample; and
   in response to determining that the visual effect is not observed in the video sample, indicating that the request for authentication is fraudulent.

16. The authentication system of claim 15, wherein the video sample comprises an audio sample, and wherein the operations comprise:
   determining a first activity or emotion of a person in the video sample based on the video sample;
   determining a second activity or emotion of the person based on the audio sample;
   comparing the first activity or emotion to the second activity or emotion; and
   in response to determining that the first activity or emotion does not correspond to the second activity or emotion, indicate that the request for authentication is fraudulent.

17. An authentication system for granting access to an account associated with a user, the authentication system comprising:
   one or more processors; and
   a non-transitory, tangible, and computer-readable medium comprising instructions that, when executed by the one or more processors, cause the authentication system to perform operations comprising:
      receiving a request for authentication, the request indicating the user;
      receiving a video sample associated with the request, the video sample comprising a corresponding audio sample;
      determining a first activity or emotion of a person in the video sample based on the video sample;
      determining a second activity or emotion of the person based on the corresponding audio sample;
      comparing the first activity or emotion to the second activity or emotion; and
      in response to determining that the first activity or emotion does not correspond to the second activity or emotion, indicating that the request for authentication is fraudulent or requesting an additional video sample.

18. The authentication system of claim 17, wherein the operations comprise:
   requesting the additional video sample to include a third activity or emotion of the person;
   receiving the additional video sample;
   determining whether the third activity or emotion of the person is observed in the additional video sample; and
   in response to determining that the third activity or emotion of the person is not observed in the additional video sample, indicating that the request for authentication is fraudulent.

19. The authentication system of claim 18, wherein the third activity or emotion comprises a physical position or movement of a body part of the person.

20. The authentication system of claim 17, wherein the operations comprise:
   instructing a smart device associated with the user to activate a light control parameter configured to cause a visual effect in the video sample; and
   in response to determining that the visual effect is not observed in the video sample, indicating that the request for authentication is fraudulent.

* * * * *